United States Patent [19]

Ebaugh et al.

[11] Patent Number: 5,348,382
[45] Date of Patent: Sep. 20, 1994

[54] ANTI-LOCK BRAKE SYSTEM ECCENTRIC BEARING ARRANGEMENT INCLUDING COUNTERWEIGHT

[75] Inventors: Roger L. Ebaugh, Charlotte, N.C.; Richard J. Janssens, Canton, Mich.

[73] Assignee: INA Bearing Company, Inc., Fort Mill, S.C.

[21] Appl. No.: 767,415

[22] Filed: Sep. 30, 1991

[51] Int. Cl.$^5$ .................................................. B60T 8/40
[52] U.S. Cl. .................................................. 303/116.4
[58] Field of Search .................... 303/116 R, 10, 116.4; 74/49, 50, 590; 417/273, 521; 91/491–498; 92/12.1

[56] References Cited

U.S. PATENT DOCUMENTS

| | | | |
|---|---|---|---|
| 2,218,927 | 10/1940 | Towler et al. | 74/50 |
| 2,515,795 | 7/1950 | Patriganani | 74/50 |
| 3,067,624 | 12/1962 | Norton et al. | 74/50 |
| 3,563,351 | 2/1971 | Leiber | 303/94 X |
| 3,689,199 | 9/1972 | Bassinger | 417/273 |
| 3,887,301 | 6/1975 | Henkel | 417/273 X |
| 3,910,164 | 10/1975 | Swander et al. | 417/273 X |
| 3,946,706 | 3/1976 | Pailler | 123/56 BC |
| 4,166,657 | 9/1979 | Blomberg et al. | 188/181 A |
| 4,242,061 | 12/1980 | Hartley | 74/50 X |
| 4,524,644 | 6/1985 | Pierrat | 74/804 |
| 4,545,123 | 10/1985 | Hartmann | 74/50 X |
| 4,550,571 | 11/1985 | Bertsch | 62/6 |
| 4,568,131 | 2/1986 | Blomberg et al. | |
| 4,657,120 | 4/1987 | Farr | 188/181 A |
| 4,883,327 | 11/1989 | Farr | 303/116 PC |
| 4,892,363 | 1/1990 | Burgdorf | |
| 4,900,233 | 2/1990 | Ripley | 417/273 X |
| 4,962,972 | 10/1990 | Pizzo | 303/116 PC |
| 4,977,606 | 12/1990 | Budecker | 417/273 X |
| 4,988,147 | 1/1991 | Zirps | 303/116 PC |

*Primary Examiner*—Robert J. Oberleitner
*Assistant Examiner*—Peter M. Poon
*Attorney, Agent, or Firm*—Wigman, Cohen, Leitner & Myers

[57] ABSTRACT

An eccentric bearing arrangement including counterweights used in the hydraulic pump of an anti-lock brake system. The invention is directed to an apparatus which provides an eccentric motion applied through an essentially non-rotating outer bearing and a counterweight to a designed eccentricity in order to diminish vibration caused by the eccentric element. Embodiments of the invention are for use in anti-skid brake system pumps that require a pulsating, eccentric load that is ultimately applied to a set of radially disposed hydraulic plungers. The apparatus of the present invention comprises an outer ring, an inner ring mounted on a drive shaft, and an outer roller bearing disposed in the raceway formed between the inner and outer rings. The raceway of the inner ring is eccentric to the drive shaft by an amount equal to one half the design stroke of the anti-lock brake system plungers. The outer ring is in direct contact with the hydraulic plunger faces. The eccentrically rotated mass of the outer bearing and the inner ring are counterweighted by a thin disc slug counterweight or a steel ball counterweight, with the counterweight located such that the mass and radius of gyration provide optimum vibration reduction.

36 Claims, 2 Drawing Sheets

ANTI-LOCK BRAKE SYSTEM ECCENTRIC BEARING ARRANGEMENT INCLUDING COUNTERWEIGHT

FIELD OF THE INVENTION

The present invention relates to the creation of designed eccentricities in bearing devices and the elimination of rotating imbalances. The invention relates specifically to designed eccentricities used to reciprocate pistons in the hydraulic pump of anti-lock brake systems, while eliminating rotating imbalances through integral counterweights.

BACKGROUND OF THE INVENTION

In anti-lock brake systems, the state of rotation of a vehicle wheel is typically monitored by a sensor. When the sensor detects a tendency of the wheel to be retarded beyond some established limit, i.e., to "lock", the accumulation of hydraulic pressure in the affected wheel brake cylinder is stopped. The pressure is reduced by partial evacuation of the wheel brake cylinder. Once the wheel speed has been reestablished above that for a "locked" wheel, the hydraulic pressure can be reestablished. In order to provide a modulation of hydraulic pressure, a hydraulic fluid pump having pistons or plungers is typically included, with the piston oscillated by means of an eccentric driven, for example, by an electric motor. In the anti-lock brake system art and related bearing art, various arrangements have been provided to create a rotating eccentricity to provide a periodic reciprocating actuation to a hydraulic pump plunger through contact with a bearing surface. However, in order to provide a designed eccentricity, a rotating imbalance occurs. The elimination of the rotating imbalance, while maintaining the eccentric contacting surface, is not addressed in the prior anti-lock brake art, as indicated in the following patents:

U.S. Pat. No. 4,166,657, issued to Blomberg et al., is directed to an anti-lock brake system which generates a relieving force to counter the braking force and shows in FIG. 1 an eccentric 40 driving a plunger 14. However, no mention is made of counterweighting.

U.S. Pat. No. 4,892,363, issued to Burgdorf shows an anti-lock brake system having a double plunger in a hydraulic pump, but no disclosure is made of eccentric modulation or counterweights. Rather, a fail safe system is disclosed in which a return line is connected from the wheel brakes to the suction chamber of a hydraulic pump, with the chamber terminating in a suction line extending from the chamber to a hydraulic fluid reservoir, with a valve or restrictor positioned in the return line upstream of a junction point between the return line and the suction line.

U.S. Pat. No. 4,568,131, issued to Blomberg et al. is directed to a hydraulic brake modulator, but shows in FIG. 2 an eccentric 13 which through a needle bearing 14, eccentric strap 15 and balls 16, 17 causes pistons 11, 12 to oscillate (col. 4, lines 15-21). No mention is made of counterweighting.

U.S. Pat. No. 4,657,120, issued to Farr shows an anti-lock braking system flywheel mechanism which includes an eccentric 40 which drives a plunger 41. No provision for counterweighting is discussed, however.

The use of counterweights to balance designed eccentricities is shown in the following patents:

U.S. Pat. No. 3,946,706, issued to Pailler and directed to two sets of head-to-tail pistons mounted in a star, shows two eccentric equilibrating counterweights 29 and 30 being in one piece with eccentric discs 16 and 17 so as to compensate for the vibratory forces exerted by the discs and their attached devices on a journal 18. Also shown are two eccentric counterweights 31 and 32 which are solid with a shaft 3 to compensate for the vibratory forces exerted on the shaft as a result of the eccentricity of the journal 18 and of the assembly coupled with the journal 18.

U.S. Pat. No. 4,550,571, issued to Bertsch shows a counterweight mounted to the drive shaft of an eccentrically driven piston in a Stirling cryogenic refrigerator.

U.S. Pat. No. 4,524,644, issued to Pierrot and directed to a counterweight for an orbital drive mechanism, shows a counterweight rotatably mounted by means of a bearing on an extension or crank arm formed integrally with an eccentric.

U.S. Pat. No. 4,545,123, issued to Hartmann and directed to a jigsaw adjusting mechanism shows a counterweight adapted to receive an eccentric integrally formed with a drive gear. The counterweight reciprocates in opposition to a plunger assembly.

In order to overcome the difficulties caused by vibrations due to the rotating imbalance of the eccentricity, counterweights which are provided increase the mass and the physical dimensions of the system. To address these shortcomings, the present invention provides counterweight embodiments which reduce system mass and axial dimension and provide more exact location of the counterweight to counter the eccentricity.

SUMMARY OF THE INVENTION

The present invention is directed to an eccentric bearing arrangement including counterweights used in the hydraulic pump of an anti-lock brake system. Specifically, the invention is directed to an apparatus which provides an eccentric motion applied through an essentially non-rotating outer bearing and a counterweight to the designed eccentricity in order to diminish vibration caused by the eccentric element. Embodiments of the invention are for use in anti-skid brake system pumps that require a pulsating, eccentric load that is ultimately applied to a set of radially disposed hydraulic plungers. The apparatus of the present invention comprises an outer ring, an inner ring mounted on a drive shaft, and an outer roller bearing disposed in the raceway formed between the inner and outer rings. The raceway of the inner ring is eccentric to the drive shaft by an amount equal to one half the design stroke of the anti-lock brake system plungers. The outer ring is in direct contact with the hydraulic plunger faces. The eccentrically rotated mass of the outer bearing and the inner ring are counterweighted by a thin disc slug counterweight or a steel ball counterweight, with the counterweight located such that the mass and radius of gyration provide optimum vibration reduction. This is accomplished by locating the counterweight diametrically opposite to the eccentric mass. Thus, the invention is directed to the use of counterweights in anti-lock brake systems to offset a designed eccentricity. The use of flat strip material for the inner ring, axial location of the outer bearing using a folded rim of strip steel and molded plastic inserts at the base of the inner ring are each also contemplated.

The embodiments of the present invention offer a number of advantages. Among these advantages are a low cost, very compact design resulting from composite construction of drawn rings, molded plastic to support the inner rings and contain the counterweights and a simple attachment to the drive shaft. The counterweight construction, whether thin disc slug or steel ball, allows ease of design in order to locate both the counterweight masses and the radius of gyration at an optimum location for vibration reduction. The design allows for a very low installed weight, further reducing the vibrational pulses to the supporting structure. Molded plastic inserts at the base of the inner rings provide an effective and inexpensive option for torque transmission into the eccentric assembly when used with roll-formed splines or sections on the drive shafts. A drawn steel inner ring made from flat strip material, with an eccentric attachment to the drive shaft, results in the eccentric attachment being capable of being pierced in place with fixed press tooling accurately and at low cost. The drawn steel inner ring attachment hole to the drive shaft can be any shape, such as hexagonal or splined, that will consistently transmit torque to the eccentric.

With the foregoing and other advantages and features of the invention that will become hereinafter apparent, the nature of the invention may be more clearly understood by reference to the following detailed description of the invention, the appended claims and to the several views illustrated in the attached drawings.

DETAILED DESCRIPTION OF THE DRAWINGS

Figure 1:
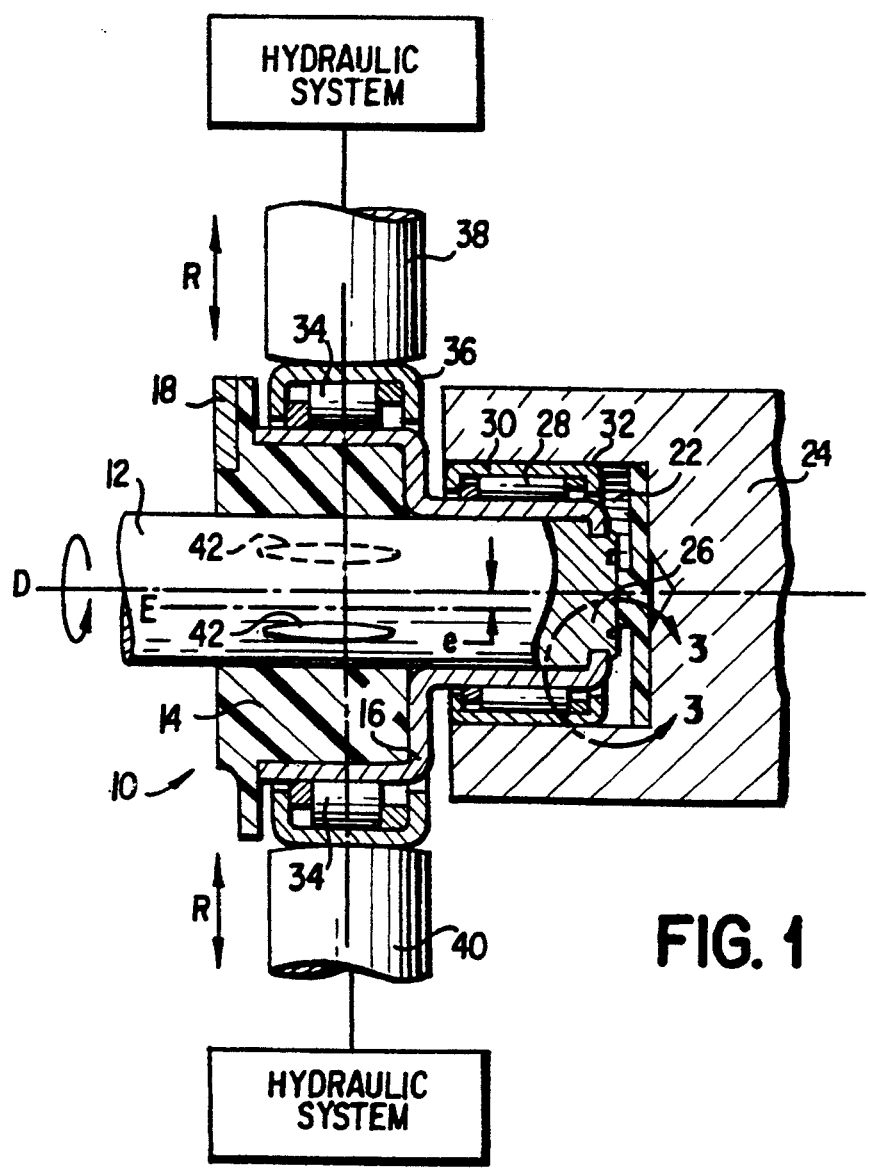
FIG. 1 is a cross-sectional elevation view of a first embodiment of the invention.
Figure 2:
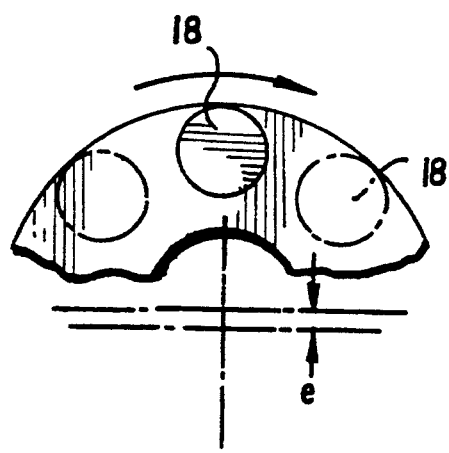
FIG. 2 is a partial front view of the counterweight mountings of the first embodiment of the invention.
Figure 3:
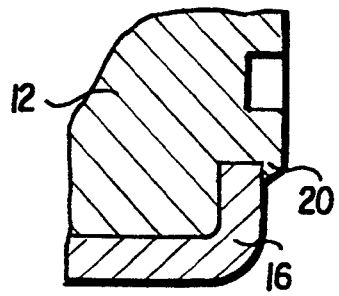
FIG. 3 is a partial sectional detail view of the mounting of an inner ring to a drive shaft for the first embodiment of the invention.

Referring now in detail to the drawings wherein like parts are designated by like reference numerals throughout, there is illustrated in FIG. 1 a sectional side view of a first embodiment of an eccentric bearing arrangement having a counterweight according to the present invention. An eccentric bearing arrangement, generally designated by the numeral 10, includes a drive shaft 12 to which is mounted a collar or insert 14, held in place by an inner ring 16. Collar 14 and inner ring 16 are immovably attached to drive shaft 12. The centerline axis E of collar 14 and inner ring 16 is eccentric to the drive shaft axis of rotation D, with the resulting eccentricity designated as e. One or more counterweights 18 are integrally mounted to collar 14 opposite the greatest eccentricity e of collar 14 and inner ring 16, as shown in FIG. 1. FIG. 2 shows a frontal view of the mounted counterweights 18, in which the counterweights 18 are mounted integrally, as for example by molding, to collar 14. The counterweights 18 shown in FIGS. 1 and 2 are metal discs. Metal balls are also contemplated. Inner ring 16 is mounted to drive shaft 12 by being swaged or staked in place for torque transmission as shown by the staked interface 20 of inner ring 16 and drive shaft 12, shown in FIG. 3.

As shown in FIG. 1, drive shaft 12 is mounted in bore 22 of a shaft mounting block 24, in contact with end bearing surface 26. Rollers 28 reside between inner ring 16 and mounting ring 30, which is in contact with cavity wall 32. Rollers 34 are mounted between inner ring 16 and outer bearing 36. Outer bearing 36 is in contact with a pair of oppositely mounted hydraulic brake plungers 38 and 40. Drive shaft 12 is optionally provided with serrations or splines 42 to enhance torque transmission.

The operation of the invention shown in FIGS. 1-2 is as follows: Drive shaft 12 is rotated about the axis of rotation D by motor means, not shown, responsive to an appropriate sensor signal. Because collar or insert 14 and inner ring 16 are attached immovably to drive shaft 12, they rotate as a unit about axis D. However, the collar 14 and inner ring 16 form an eccentricity e relative to axis D, shown by the offset of centerline axis E. This results in rollers 34 and outer bearing 36 being moved radially outwardly as the eccentric rotates and acting as cam surfaces in contact with plungers 38, 40. This, in turn, results in plungers 38, 40 reciprocating as shown by arrows R. The collar 14 and inner ring 16 create a rotating imbalance, which is counterbalanced by counterweights 18. This counterbalancing is accomplished by locating the counterweights 18 such that their combined center of mass is diametrically opposite to the center of mass of the eccentricity of collar 14.

Figure 4:
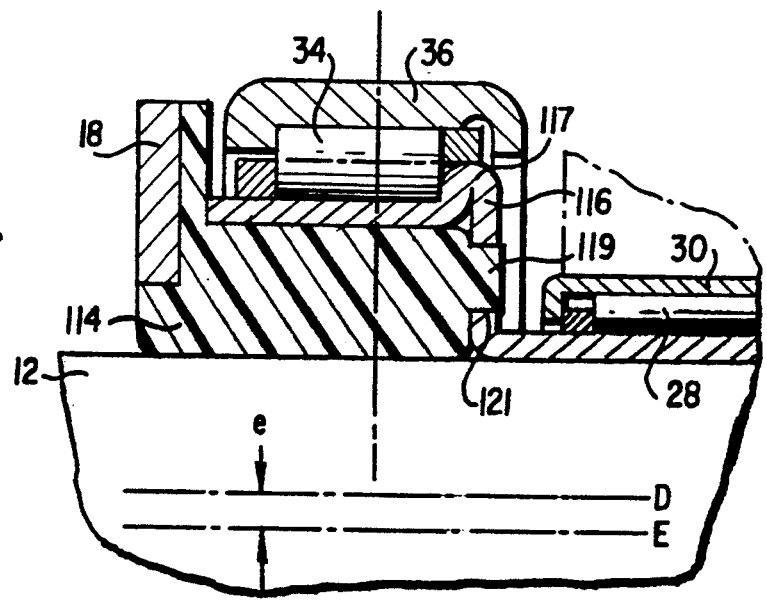
FIG. 4 is a partial sectional side view of an alternative inner ring for the first embodiment of the invention.

FIG. 4 shows an alternative arrangement of an inner ring, designated 116, having a crimp 117 for holding and positioning the roller 34 of FIG. 1. Inner ring 116 also has a hole 121 through which an insert register 119 protrudes to hold the collar 114 in place.

Figure 5:
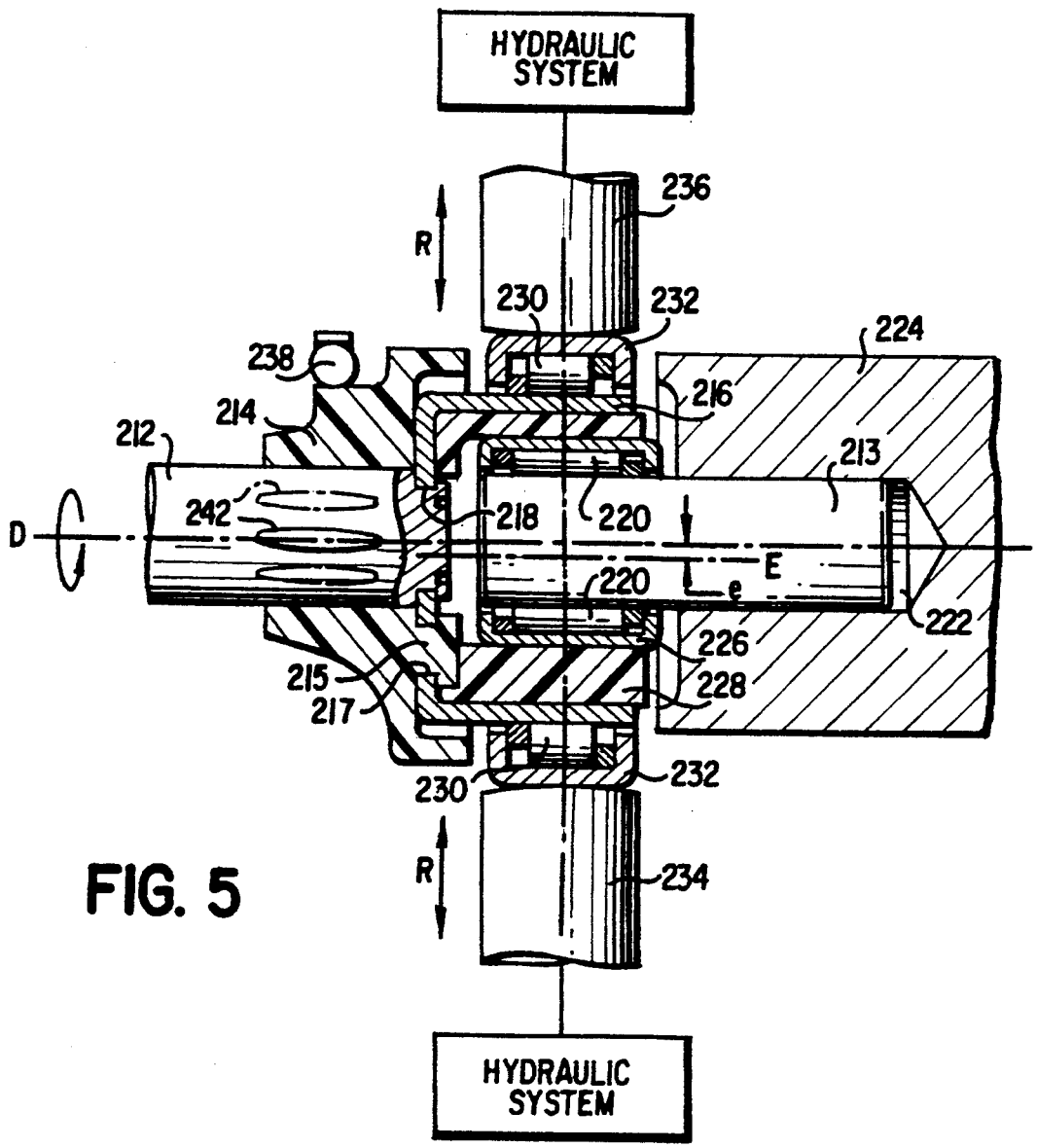
FIG. 5 is a cross-sectional elevation view of a second embodiment of the invention.

FIG. 5 shows a second embodiment of the invention having a two-piece eccentric insert or collar, collar 214 and eccentric insert 228. Drive shaft 212 is aligned with stationary shaft 213 so that their respective centerlines are along the same longitudinal axis D which is also the axis of rotation of the drive shaft 212. Stationary shaft 213 is mounted in a bore 222 of a shaft mounting block 224. Stationary shaft 213 is interference fit into block 224 so as not to rotate. The first piece of the two-piece insert or collar, collar 214, is mounted on drive shaft 212. Inner ring 216, having register hole 217 holds collar register 215. Inner ring 216 is fit to the end of drive shaft 212 at diameter 218. The end of the drive shaft 212 is staked or cold-rolled outward to hold inner ring 216 in place. Inner rollers 220 are in rolling contact with stationary shaft 213. Concentric ring 226 holds the rollers 220 in place and is molded to the second piece of the two-piece eccentric insert or collar, eccentric insert 228, which is held in place by inner ring 216. Outer rollers 230 reside between inner ring 216 and outer bearing 232. Outer bearing 232 is in contact with hydraulic plungers 234, 236 to serve as a cam surface. Counterweight 238 is mounted on collar 214 diametrically opposite the center of mass of the eccentricity of collar 214 and insert 228 to offset the rotating imbalance of the eccentricity of collar 214, insert 228 and inner ring 216. Counterweight 238 is shown as a ball, made, for example, of metal such as steel. It is contemplated that counterweight 238 also be a disc. Counterweight 238 is mounted integrally as by molding, in collar 214. Similar to the first embodiment, drive shaft 212 is optionally provided with serrations or splines 242 to enhance torque transmission.

As in the first embodiment, drive shaft 212 is rotated about its axis of rotation D, with the eccentricity e (shown as the distance between eccentric centerline axis E and axis of rotation D) of inner ring 216 and insert 228 causing outer rollers 230 and outer bearings 232 to move a distance equivalent to the eccentricity e, thus reciprocating hydraulic brake plungers 234, 236 in the direction shown by arrows R. Counterweight 238 balances the rotating imbalance of inner ring 216 and insert 228.

Although certain presently preferred embodiments of the invention have been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

What is claimed is:

1. Apparatus for imparting an eccentric motion to the periphery thereof, comprising:
   a. means for imparting reciprocatable motion to a component located at the periphery of said apparatus, said reciprocatable motion imparting means rotatable about an axis of rotation and having a centerline axis eccentrically aligned parallel to said axis of rotation, and
   b. counterbalancing means integrally formed so as to be disposed within said reciprocatable motion imparting means.

2. In an anti-lock brake system, having a hydraulic system, an apparatus comprising:
   a. means for imparting pressure to the hydraulic system in reciprocatable communication with the hydraulic system,
   b. means for imparting reciprocatable motion to said pressure imparting means, said reciprocatable motion imparting means rotatable about an axis of rotation and having a centerline axis eccentrically aligned parallel to said axis of rotation, and
   c. counterbalancing means integrally formed so as to be disposed within said reciprocatable motion imparting means.

3. Apparatus as in claims 1 or 2, wherein said counterbalancing means is a slug molded into said reciprocatable motion imparting means.

4. Apparatus as in claims 1 or 2, wherein said counterbalancing means is a ball molded into said reciprocatable motion imparting means.

5. Apparatus as in claim 2, wherein said means for imparting pressure to the hydraulic system comprises a plurality of hydraulic pump plungers adapted to contact said reciprocatable motion imparting means.

6. Apparatus for imparting an eccentric motion to the periphery thereof, comprising:
   a. means for imparting reciprocatable motion to a component located at the periphery of said apparatus, said reciprocatable motion imparting means comprising an eccentric molded plastic collar mounted on a drive shaft, an eccentric inner ring mounted on said drive shaft and attached to said eccentric collar and an outer ring mounted concentric to said inner ring, and said reciprocatable motion imparting means being rotatable about an axis of rotation and having a centerline axis eccentrically aligned parallel to said axis of rotation, and
   b. counterbalancing means integrally formed so as to be disposed within said reciprocatable motion imparting means.

7. In an anti-lock brake system, having a hydraulic system, an apparatus comprising:
   a. means for imparting pressure to the hydraulic system in reciprocatable communication with the hydraulic system,
   b. means for imparting reciprocatable motion to said pressure imparting means, said reciprocatable motion imparting means comprising an eccentric molded plastic collar mounted on a drive shaft, an eccentric inner ring mounted on said drive shaft and attached to said eccentric collar and an outer ring mounted concentric to said inner ring, and said reciprocatable motion imparting means being rotatable about an axis of rotation and having a centerline axis eccentrically aligned parallel to said axis of rotation, and
   c. counterbalancing means integrally formed so as to be disposed within said reciprocatable motion imparting means.

8. Apparatus as in claim 6 or 7, wherein said eccentric inner ring is mounted on said eccentric collar.

9. Apparatus as in claim 6 or 7, wherein said eccentric collar is further comprised of a first portion and a second portion, with said eccentric inner ring attached adjacent to said eccentric collar first portion and mounted on said second portion, said counterweight mounted in said first portion.

10. Apparatus as in claim 6 or 7, wherein said inner ring and said outer ring are each made of drawn steel.

11. Apparatus as in claim 6 or 7, wherein a plurality of rollers are disposed between said inner ring and said outer ring.

12. Apparatus as in claim 6 or 7, wherein said drive shaft includes a plurality of serrations thereon.

13. Apparatus as in claim 6 or 7, wherein said inner ring is staked to said drive shaft.

14. Apparatus for transmitting an eccentric motion to the periphery thereof, comprising:
   a. a drive shaft having an axis of rotation;
   b. an eccentric collar mounted to said drive shaft, and an eccentric inner ring mounted on said drive shaft and attached to said eccentric collar, said collar and said inner ring having a centerline axis parallel to, and displaced by an eccentric distance from, the axis of rotation of said drive shaft; the mass of said collar and said inner ring being greatest relative to the centerline axis in the direction of eccentricity of said collar and inner ring;
   c. a counterweight mounted integrally so as to be disposed within said collar and diametrically positioned relative to said eccentric mass; and
   d. an outer ring mounted concentric to said inner ring and adapted to engage at least one hydraulic fluid pump plunger.

15. Apparatus as in claim 14, wherein said eccentric inner ring is mounted on said eccentric collar.

16. Apparatus as in claim 14, wherein said eccentric collar is further comprised of a first portion and a second portion, with said eccentric inner ring attached adjacent to said eccentric collar first portion and mounted on said second portion, said counterweight mounted in said first portion.

17. Apparatus as in claim 14, wherein said counterweight is a slug molded into said eccentric collar.

18. Apparatus as in claim 14, wherein said counterweight is a ball molded into said eccentric collar.

19. Apparatus as in claim 14, wherein said drive shaft includes a plurality of serrations thereon.

20. Apparatus as in claim 14, wherein said collar is molded plastic.

21. Apparatus as in claim 14, wherein said inner ring and said outer ring are each made of drawn steel.

22. Apparatus as in claim 14, wherein a plurality of rollers are disposed between said inner ring and said outer ring.

23. Apparatus as in claim 14, wherein said inner ring is staked to said drive shaft.

24. In an anti-lock brake system having a hydraulic system, an apparatus comprising:
  a. an eccentric bearing having
    i. a drive shaft having an axis of rotation;
    ii. an eccentric collar mounted to said drive shaft, and an eccentric inner ring mounted on said drive shaft and attached to said eccentric collar, said collar and said inner ring having a centerline axis parallel to, and displaced by an eccentric distance from, the axis of rotation of said drive shaft, thereby forming an eccentricity in a direction relative to said centerline axis; the mass of said collar and said inner ring being greatest relative to the centerline axis in the direction of eccentricity of said collar and inner ring;
    iii. a counterweight mounted integrally so as to be disposed within said collar and diametrically positioned relative to said eccentric mass; and
    iv. an outer ring mounted concentric to said inner ring; and
  b. a plurality of hydraulic fluid pump plungers adapted to communicate with the hydraulic system of the anti-lock brake system and in reciprocatable contact with said eccentric bearing.

25. Apparatus for imparting an eccentric motion to the periphery thereof, comprising:
  a. means for imparting reciprocatable motion to a component located at the periphery of said apparatus, said reciprocatable motion imparting means comprising an eccentric mass rotatable about an axis of rotation and having a centerline axis eccentrically aligned parallel to said axis of rotation, and
  b. a counterbalancing means for counterbalancing said eccentric mass, said counterbalancing means integrally formed in said reciprocatable motion imparting means, said counterbalancing means located diametrically from and only the one side of said eccentric mass.

26. Apparatus as in claim 25, wherein said counterbalancing means consists of a single counterbalancing means.

27. In an anti-lock brake system, having a hydraulic system, an apparatus comprising:
  a. means for imparting pressure to the hydraulic system in reciprocatable communication with the hydraulic system,
  b. means for imparting reciprocatable motion to said pressure imparting means, said reciprocatable motion imparting means comprising an eccentric mass rotatable about an axis of rotation and having a centerline axis eccentrically aligned parallel to said axis of rotation, and
  c. a counterbalancing means for counterbalancing said eccentric mass, said counterbalancing means integrally formed in said reciprocatable motion imparting means, said counterbalancing means located diametrically from and only to one side of said eccentric mass.

28. Apparatus as in claim 22, wherein said counterbalancing means consists of a single counterbalancing means.

29. Apparatus for transmitting an eccentric motion to the periphery thereof, comprising:
  a. a drive shaft having an axis of rotation;
  b. an eccentric collar mounted to said drive shaft, and an eccentric inner ring mounted on said drive shaft and attached to said eccentric collar, said collar and said inner ring having a centerline axis parallel to, and displaced by an eccentric distance from, the axis of rotation of said drive shaft; the mass of said collar and said inner ring being greatest relative to the centerline axis in the direction of eccentricity of said collar and inner ring;
  c. a counterweight mounted integrally in said collar adjacent to said inner ring and positioned diametrically from and only to one side of said eccentric mass: and
  d. an outer ring mounted concentric to said inner ring and adapted to engage at least one hydraulic fluid pump plunger.

30. Apparatus as in claim 29 wherein said counterweight consists of a single counterweight.

31. In an anti-lock brake system having a hydraulic system, an apparatus comprising:
  a. an eccentric bearing having
    i. a drive shaft having an axis of rotation;
    ii. an eccentric collar mounted to said drive shaft, and an eccentric inner ring mounted on said drive shaft and attached to said eccentric collar, said collar and said inner ring having a centerline axis parallel to, and displaced by an eccentric distance from, the axis of rotation of said drive shaft, thereby forming an eccentricity in a direction relative to said centerline axis; the mass of said collar and said inner ring being greatest relative to the centerline axis in the direction of eccentricity of said collar and inner ring;
    iii. a counterweight mounted integrally in said collar adjacent to said inner ring and positioned diametrically from and only to one side of said eccentric mass; and
    iv. an outer ring mounted concentric to said inner ring; and
  b. a plurality of hydraulic fluid pump plungers adapted to communicate with the hydraulic system of the anti-lock brake system and in reciprocatable contact with said eccentric bearing.

32. Apparatus as in claim 31, wherein said counterweight consists of a single counterweight.

33. Apparatus for imparting an eccentric motion to the periphery thereof, comprising:
  a. means for imparting reciprocatable motion to a component located at the periphery of said apparatus, said reciprocatable motion imparting means comprising an eccentric molded plastic collar mounted on a drive shaft, an eccentric inner ring mounted on said drive shaft and attached to said eccentric collar and an outer ring mounted concentric to said inner ring, and said reciprocatable motion imparting means being rotatable about an axis of rotation and having a centerline axis eccentrically aligned parallel to said axis of rotation, and
  b. a counterbalancing means for counterbalancing said eccentric collar integrally formed in said reciprocatable motion imparting means, said counterbalancing means located adjacent to said rings and positioned diametrically from and only to one side of opposing said eccentric collar.

34. Apparatus as in claim 33, wherein said counterbalancing means consists of a single counterbalancing means.

35. In an anti-lock brake system, having a hydraulic system, an apparatus comprising:
   a. means for imparting pressure to the hydraulic system in reciprocatable communication with the hydraulic system,
   b. means for imparting reciprocatable motion to said pressure imparting means, said reciprocatable motion imparting means comprising an eccentric molded plastic collar mounted on a drive shaft, an eccentric inner ring mounted on said drive shaft and attached to said eccentric collar and an outer ring mounted concentric to said inner ring, and said reciprocatable motion imparting means being rotatable about an axis of rotation and having a centerline axis eccentrically aligned parallel to said axis of rotation, and
   c. a counterbalancing means for counterbalancing said eccentric collar integrally formed in said reciprocatable motion imparting means, said counterbalancing means located adjacent to said rings and positioned diametrically from and only to one side of said eccentric collar.

36. Apparatus as in claim 35, wherein said counterbalancing means consists of a single counterbalancing means.

* * * * *